March 30, 1948. E. R. KNOWLES 2,438,856
INJECTION MOLDING MACHINE
Filed Feb. 5, 1944 3 Sheets-Sheet 1
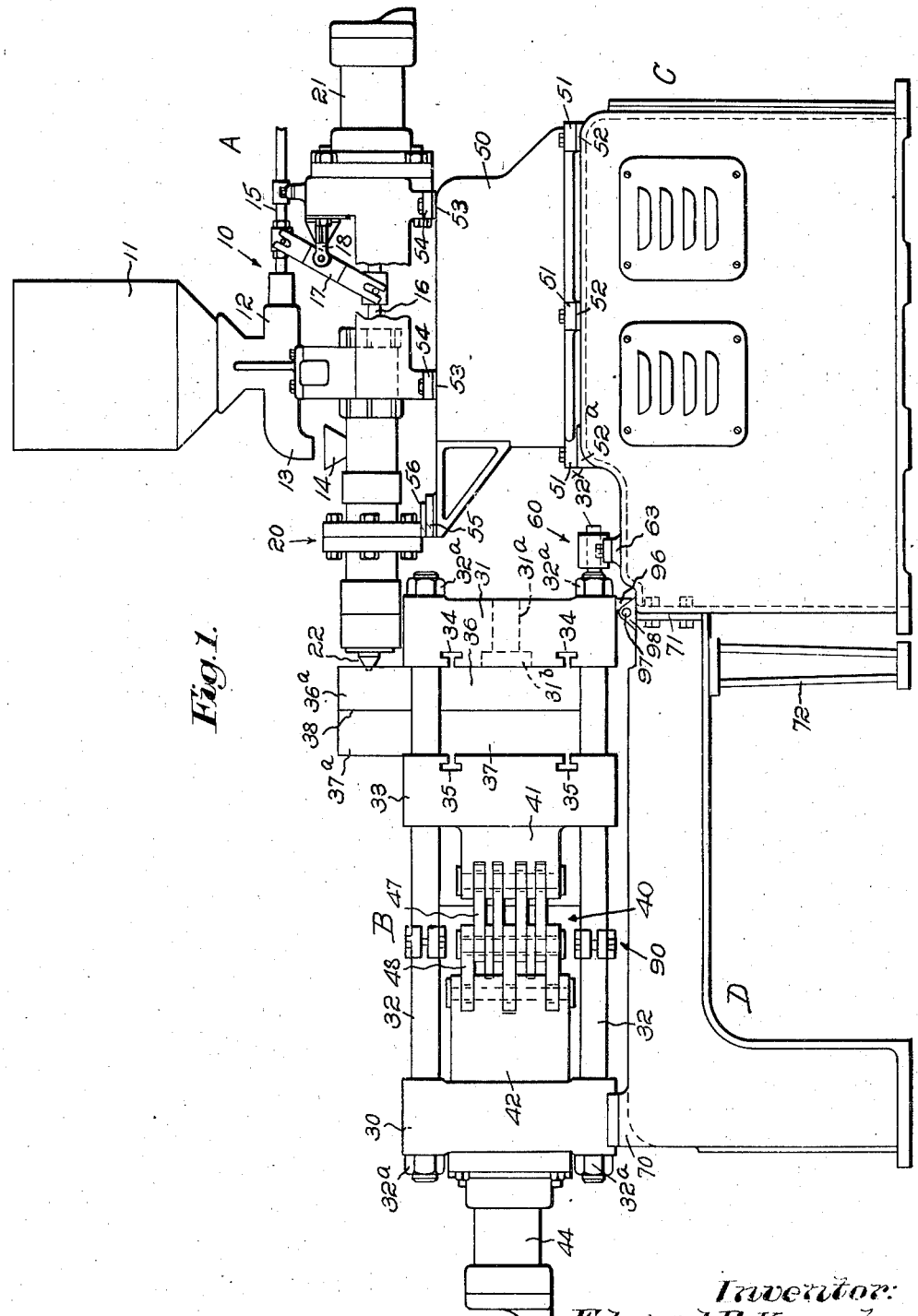
Fig. 1.

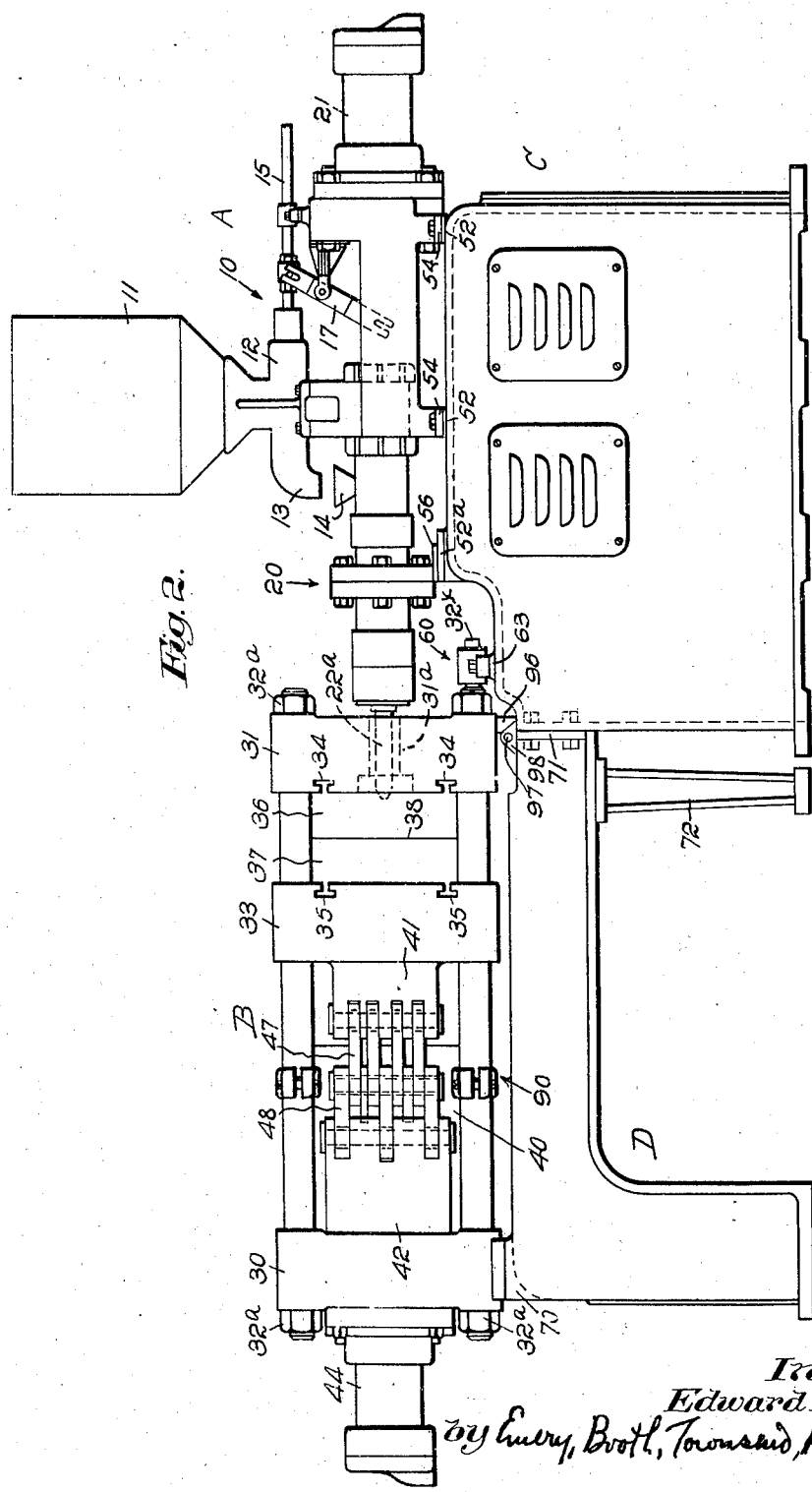

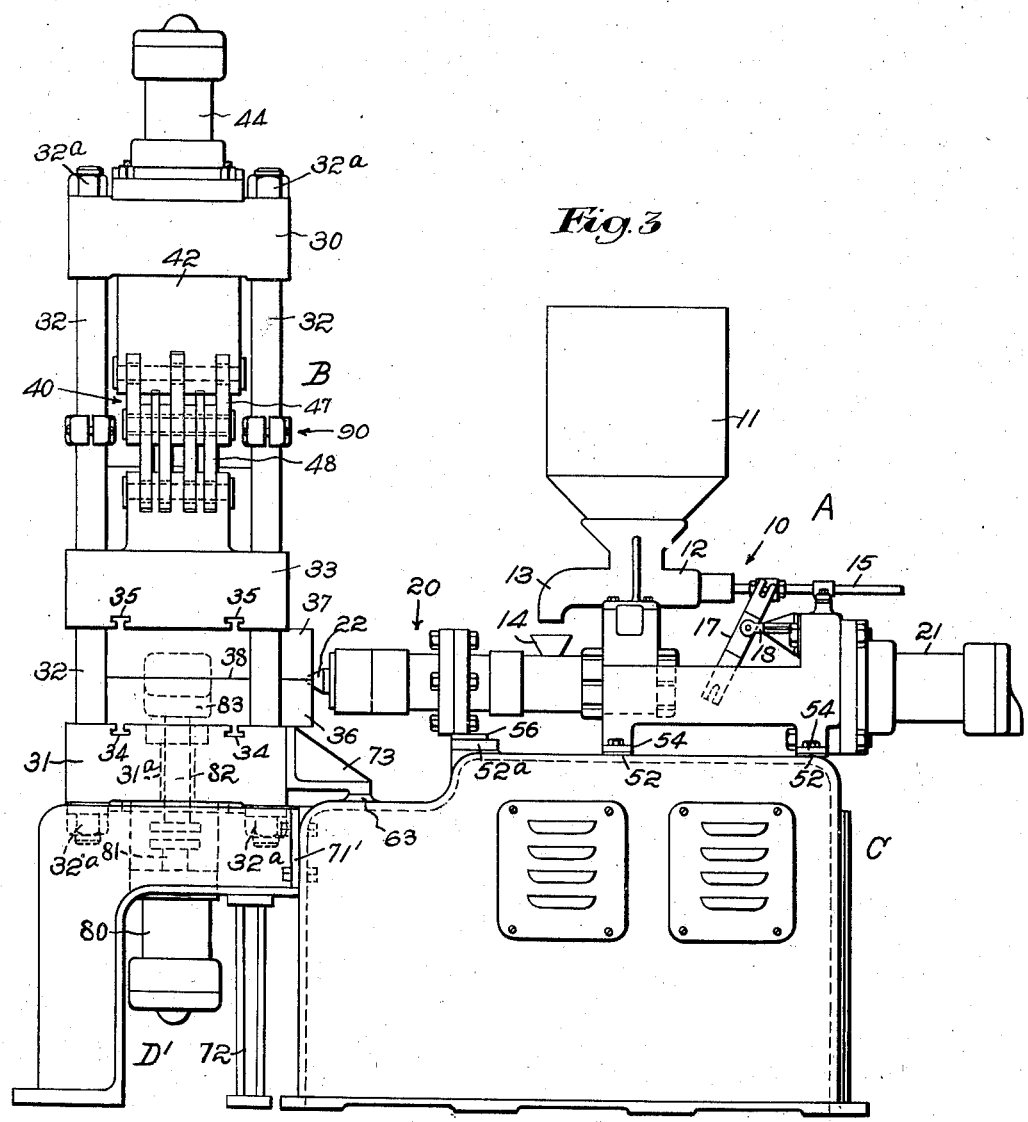

Patented Mar. 30, 1948

2,438,856

UNITED STATES PATENT OFFICE 2,438,856

INJECTION MOLDING MACHINE

Edward R. Knowles, Nashua, N. H.

Application February 5, 1944, Serial No. 521,171

1 Claim. (Cl. 18—30)

My present invention relates to the molding of plastic materials. Among its aims is to provide molding apparatus wherein various main elements are structurally adapted for different relative positioning and operative assembly to satisfy different manufacturing conditions and requirements. The invention further aims to provide in apparatus of the general class referred to various improvements contributing to the production of a wide range of molded articles of better and more uniform quality and also affording greater safety in operation, generally extending the useful range and life of the equipment and increasing its productive efficiency.

In the drawings illustrating by way of example certain embodiments of the invention and of means whereby the methods thereof may be practiced:

Fig. 1 is a side elevation of a molding assembly wherein the several elements or units are disposed for generally horizontal operation of the dies and to which latter the molding material is presented laterally;

Fig. 2 is a similar elevation showing the corresponding machine units of Fig. 1 installed as for entering the molding material substantially centrally of horizontally operative dies; and Fig. 3 is a corresponding elevation of the apparatus of Figs. 1 and 2 disposed for vertical operation of the dies and for lateral presentation of the molding material to them.

Referring to the drawings in more detail, and first in general to the apparatus as a whole and as seen in the interchangeable installations of Figs. 1, 2 and 3, the same comprises several main elements, units or assemblies. These include a material feed and conditioning assembly or injection unit A, and a molding unit or press B, for hydraulic or other operation. The injection unit A is mounted on a base or frame element indicated generally at C, adapted to house the actuating and control system, the latter preferably hydraulic and either self-contained or associated with an outside or central power source. The molding press B is supported jointly by this frame or housing C and a separable frame element indicated generally at D.

The material conditioning and injection unit comprises in general a measuring and feeding mechanism indicated as a whole by the numeral 10 and a charging head or cylinder designated generally at 20. The material to be molded, in granular or other form, is supplied from a hopper 11 to a feed chamber 12 for delivery as at the port 13 arranged to present it to an inlet 14 admitting to the conditioning cylinder 20. Measured charges of the material are delivered from the feeding chamber 12 as by means of a reciprocating feed rod 15. The latter is actuated in proper timed relation, herein through connections with a material charging plunger 16 provided with drive means illustrated as of the hydraulic type, comprising the cylinder 21 having appropriate control valves. In the illustrated example, the connections between the charging plunger and the feed rod include a two-arm lever 17 mounted for rocking action on a fixed part such as the bracket 18 and pivotally connected at its opposite ends with the feed rod and the charging plunger respectively.

Charges of the molding material are thus advanced into the conditioning cylinder 20 and discharged at the nozzle 22 for injection into the mold space. The cylinder 20 desirably includes heating means and torpedo or other means, not necessary to show in detail here, for distributing and guiding the conditioned material to the nozzle. This injection cylinder may be similar to that as more fully disclosed and claimed in my copending application Serial No. 523,678, filed February 24, 1944, such unit or assembly A being here illustrated sufficiently for indicating its relation and general manner of assembly in combination with the apparatus as a whole.

Considering now the molding unit or press B, seen in different assembled relations in Figs. 1, 2 and 3, the same comprises an outer stationary end plate or head 30 and an inner or opposite end plate and die holder 31. These are connected by a series of parallel rods 32, four of them in the present instance, provided at their respective ends with cap nuts 32a. The end plate 30 is mounted in firmly fixed position on a basal support, herein the frame unit D, as at 70, and is held against movement relative to the rods 32 by the anchoring nuts 32a. The end die-holder plate 31 is movably supported on the rods 32, where it is held against outward movement by the adjacent end nuts 32a, which latter are turned up on the reduced threaded ends of the rods, against shoulders thereon.

Also slidably mounted on the bars 32 is the inner die-holder plate 33, adapted for advance toward and opening retraction from the end die plate 31. These die plates 31, 33 have at their opposed faces slots or like attaching means as at 34, 35 to receive mounting studs or like formations on the removable dies proper 36, 37, the parting line of which is indicated at 38.

The inner holder plate 33 together with its die element is controlled and operated herein through a toggle mechanism designated generally at 40, disposed between and connected with posts or bosses 41 and 42 on said holder plate and on the fixed outer end plate 30 respectively. Actuation of the toggle mechanism, and its links 47, 48 for advancing, holding closed and retracting the movable die elements is effected as by means of a plunger, adapted to be driven in the opposite directions by power applying means such as the hydraulic cylinder 44 here shown by way of example. This toggle mechanism and the novel manner of operation is more fully described in my application Ser. No. 573,335, filed Jan. 18, 1945, entitled "Plastics molding apparatus," a division of the present application. Said divisional application may also be referred to for a detailed description of the knock-out mechanism herein generally referred to by numeral 90.

Referring to Fig. 1, the four main assemblies or units are there shown in their operative arrangement for what is here termed offset or overhead injection. In such operation the material is delivered to the dies through an orifice laterally spaced from the longitudinal axis of the press, out of line with the die cavity or cavities transversely to the direction of opening and closing. Such arrangement is particularly suited for molding plate-like and other parts, such for example as transparent covers for dials, gauges, clocks and the like, where the main face or surface area desirably is clear of disfiguring irregularities as likely to result from removal of spurs, sprue slugs or other superfluous material thereat. Accordingly the dies proper 36, 37 are formed with lateral extensions 36a, 37a into which the sprue, gate, or other passages are extended from the mold cavity or cavities and into communication with an offset or overhead external orifice for seating the nozzle 22 and for entry of the molding material delivered by the latter.

To present the injection unit A with its conditioning cylinder 20 and nozzle 22 in proper alignment with such offset injection orifice, the main frame or base unit C is equipped with a detachable top extension or table 50 proportioned and arranged for removable seating on the frame C and of a height to dispose the injection unit A at the desired level. This table 50 is formed at its lower portion with a plurality of feet or like attaching formations 51, herein at rear, intermediate and forward locations, for reception by corresponding seating formations 52, 52, 52a on the base C, where they are demountably fixed as by bolts or otherwise. Similarly, at its upper portion the table 50 has rear and intermediate seats 53 for lateral bosses or feet 54 at the lower portion of the injection unit A. Further attaching means includes at the inner or forward end of the table 50 a guide plate 55 having a longitudinal guide slot for reception of a slide block 56 secured to the conditioning cylinder 20, affording capacity for longitudinal adjustment of the latter, in a manner as more fully described in my copending application Serial No. 523,678 previously mentioned.

In this Fig. 1 assembly of the several units, for the described overhead or offset injection operations, the press unit B is disposed for operation in a horizontal plane, as also in the Fig. 2 arrangement. Accordingly it is supported at its inner end on the main frame C, herein by means of novel expansion bearing means indicated generally at 60, slidably receiving a reduced diameter non-threaded end portion 32x of each rod 32.

At its other end the press unit B is fixedly supported on the adjacent underlying portion of the demountable frame extension unit D, through the medium of detachable anchor means as indicated at 70. This frame element D is removably attached at its inner end portion to the main frame or base unit C, being provided with attaching flanges or the like 71 for reception by corresponding formations on the main frame C, the parts being firmly but detachably intersecured as by bolting. To retain the frame D in level position when disassociated from the frame C it desirably has a supporting leg or upright 72 at its inner portion, serving also as further bracing means for the press unit B.

Fig. 2 illustrates a further manner of assembly of the four main units A to D, again for injection operations in a general horizontal plane, but in this instance with the elongated injection nozzle 22a extended through a bore 31a provided therefor in the inner end die plate 31 and through which the nozzle is applied in line with the path of the movable die 37. In this installation the extension table 50 of Fig. 1 is demounted and the injection unit A as a whole installed directly at the top of the main frame C. For this purpose the supporting feet 54 of the unit A and the seats 52 on the frame C are so spaced and arranged as to come opposite each other in proper seating relation in the assembly as in Fig. 2, for "in-line" injection. Similarly, the previously mentioned forward seat 52a of frame C is formed as a slotted guide member corresponding to the guide 55 of Fig. 1, for adjustable reception of the foot 56 of the injection unit. In other words, the series of attaching formations 52, 52a of the base C and the members 53, 55 of the extension table 50 of Fig. 1 are selectively available for attachment of the injection unit A. Otherwise than as stated the general arrangement and interconnection of the several units B, C and D may be the same in Fig. 2 as in connection with the set-up as illustrated in Fig. 1.

Referring now to Fig. 3, a still further arrangement of the several units is there shown, in which the press unit B is disposed for operation in the vertical plane. In this case the relation and manner of attachment as between the injection unit A and the main frame C may be the same as in Fig. 2. The lateral frame or base D of Figs. 1 and 2 is here substituted by a similar but shorter frame unit D" having similar provision at its inner portion for detachably securing it, as at 71" to the adjacent portion of the frame C, and also having independent or self-supporting means 72 as for unit D of Figs. 1 and 2. The upper portion of this alternative frame D' is formed with appropriately spaced apertures for reception of the lower ends of the now vertical supporting rods 32 of the press B. The latter as a whole may be readily installed on the frame D' by removing the anchor nuts 32a, setting the ends of the bars 32 down through said receiving apertures of the frame and then replacing the nuts, substantially as in Fig. 3. The press unit may be additionally braced and anchored as by means of a bracket 73 secured at its outer end to the adjacent face of the now lower and stationary die plate 31, and at its inner portion fixed upon a seat 63 on the frame C which forms a portion of the expansion bearing 60 previously mentioned in connection with Figs. 1 and 2.

In this Fig. 3 installation the apparatus as a whole may be employed for the practice of the novel molding method as disclosed and claimed in my earlier copending application Serial No. 503,360, filed Sept. 22, 1943, upon installation of certain means as comprised in the apparatus of said invention and application and for which the press unit B and its supporting means are herein adapted; or it may be utilized for molding operations of the usual or standard type.

Accordingly the end die plate 31 which has become the bottom end member in this vertical installation has attached at its underface an hydraulic cylinder 80 having a ram 81 in line with the stem 82 of a presser head or force 83. The latter is movably positioned and guided in a chamber provided for the purpose in the bottom die 36 which is of the spiral construction and arrangement for cooperation with this force or compressive die element 83, as more fully disclosed and claimed in my copending application Serial No. 503,360 previously mentioned. It will be noted that the stem 82 of this force element 83 is received and guided in the same through aperture 31a of the die-holder plate 31 which in the Fig. 2 installation is employed for entry of the elongated nozzle 22a.

For standard molding operations the lower hydraulic cylinder 80, Fig. 3, together with the associated force element 82, 83 may be omitted, in which case the aperture 31a in the end plate 31 may be closed as by a removable insert 31b, the latter also being employed in connection with the offset injection operations of the Fig. 1 installation.

Having disclosed a preferred embodiment of my invention, what I claim is:

Plastics molding apparatus comprising, in combination, a plurality of assembly units mutually adapted for installation in different selected operative relations, said units including a material feeding, conditioning and injecting unit provided with spaced mounting and securing formations along its under surface, a main base unit adapted to house actuating and control means for the apparatus, an auxiliary support attached to said main base unit, a molding press mounted on said auxiliary support and adapted to secure molding die parts in operative relation to said injecting unit, mounting and securing formations on said main base unit complementary to those on said injection unit and having identical spacing, and a demountable top extension disposed horizontally between said units and provided with upper and lower mounting and securing formations complementary respectively to those on said injection unit and on said main base unit, the upper mounting and securing formations on said extension being displaced laterally from the lower formations thereof, whereby said injecting unit may be secured directly to said main base unit in one lateral relationship, or indirectly through the intermediary of said extension at a higher level and in a different lateral relationship.

EDWARD R. KNOWLES.

REFERENCES CITED

The following references are of record in the file of this patent:

UNITED STATES PATENTS

| Number | Name | Date |
| --- | --- | --- |
| 2,293,304 | Muller et al. | Aug. 18, 1942 |
| 2,309,460 | Lester | Jan. 26, 1943 |
| 2,333,056 | Thoreson et al. | Oct. 26, 1943 |